United States Patent
Imai

(10) Patent No.: US 10,939,352 B2
(45) Date of Patent: Mar. 2, 2021

(54) EDGE SERVER AND DATA MANAGEMENT METHOD

(71) Applicant: FUJITSU LIMITED, Kawasaki (JP)

(72) Inventor: Satoshi Imai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/511,791

(22) Filed: Jul. 15, 2019

(65) Prior Publication Data
US 2019/0342814 A1 Nov. 7, 2019

Related U.S. Application Data

(63) Continuation of application No. PCT/JP2017/047076, filed on Dec. 27, 2017.

(30) Foreign Application Priority Data

Jan. 19, 2017 (JP) .............................. JP2017-007343

(51) Int. Cl.
*H04W 36/32* (2009.01)
*H04W 28/14* (2009.01)
(Continued)

(52) U.S. Cl.
CPC ............ *H04W 36/32* (2013.01); *H04W 28/14* (2013.01); *H04W 36/023* (2013.01);
(Continued)

(58) Field of Classification Search
CPC ........ H04L 67/10; H04L 63/101; H04L 41/12; H04L 67/2871; H04L 67/1089;
(Continued)

(56) References Cited

U.S. PATENT DOCUMENTS

2008/0107082 A1* 5/2008 Igarashi ................ H04W 36/02
370/331
2012/0129528 A1* 5/2012 Kobayashi ........ H04W 36/0016
455/436
(Continued)

FOREIGN PATENT DOCUMENTS

JP 2000-268212 A 9/2000
JP 2015-005225 A 1/2015
(Continued)

OTHER PUBLICATIONS

International Search Report and Written Opinion, issued by International Searching Authority in corresponding International Application No. PCT/JP2017/047076, dated Mar. 27, 2018. (PCT/ISA/210, PCT/ISA/220 & PCT/ISA/237).
(Continued)

*Primary Examiner* — Brian D Nguyen
(74) *Attorney, Agent, or Firm* — Arent Fox LLP

(57) ABSTRACT

An edge server includes a memory configured to store obtained terminal information and a processor coupled to the memory and configured to obtain, from the terminal device, terminal information including a location and a moving speed of the terminal device and at a first time when the terminal device is located within a coverage area of the edge server, estimate a location of the terminal device at a second time after the first time based on at least first terminal information of the terminal device obtained at the first time, and copy the accumulated edge data of the terminal device to another edge server whose coverage area includes the estimated location of the terminal device at the second time.

8 Claims, 13 Drawing Sheets

(51) Int. Cl.
*H04W 36/02* (2009.01)
*H04W 36/18* (2009.01)
*H04W 64/00* (2009.01)
*H04W 92/20* (2009.01)

(52) U.S. Cl.
CPC ......... *H04W 36/18* (2013.01); *H04W 64/003* (2013.01); *H04W 92/20* (2013.01)

(58) Field of Classification Search
CPC .............. H04L 67/2809; H04L 67/288; H04L 45/021; H04L 67/1087; H04L 45/08; H04W 36/18; H04W 4/029; H04W 4/026; H04W 4/027; H04W 64/003; H04W 36/023; H04W 36/32; H04W 28/14; H04W 92/20; H04W 36/38
See application file for complete search history.

(56) References Cited

U.S. PATENT DOCUMENTS

| | | | |
|---|---|---|---|
| 2014/0162652 A1* | 6/2014 | Kang | H04W 36/32 455/436 |
| 2015/0215742 A1* | 7/2015 | Ikeda | H04W 68/02 455/456.1 |
| 2016/0081003 A1 | 3/2016 | Ishihara et al. | |
| 2016/0095000 A1* | 3/2016 | Duan | H04W 16/18 455/436 |
| 2017/0178268 A1* | 6/2017 | Ishikawa | G06Q 50/30 |
| 2018/0192330 A1 | 7/2018 | Yamasaki et al. | |
| 2019/0191341 A1* | 6/2019 | Trang | H04W 36/08 |

FOREIGN PATENT DOCUMENTS

| | | |
|---|---|---|
| JP | 2015-156623 A | 8/2015 |
| JP | 2015-161545 A | 9/2015 |
| JP | 2016-063315 A | 4/2016 |
| WO | WO-2017/002735 A1 | 1/2017 |

OTHER PUBLICATIONS

Communication from the Japanese Patent Office in counterpart application No. 2017-007343, dated Dec. 22, 2020.

* cited by examiner

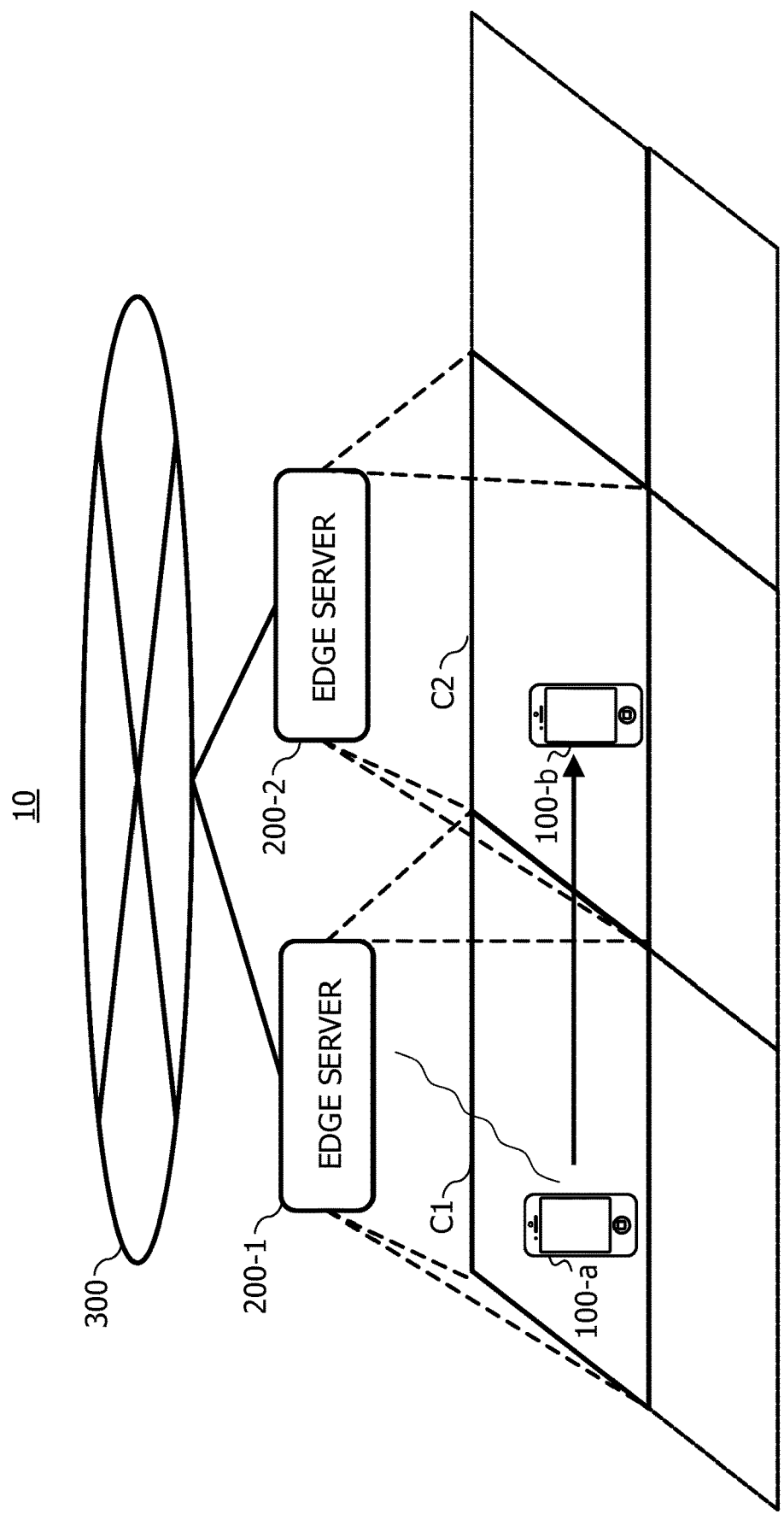

FIG. 2A

PRIOR TO
MOVEMENT (C22)

| C11 | C12 | C13 | C14 | C15 |
|-----|-----|-----|-----|-----|
| C21 | C22 | C23 | C24 | C25 |
| C31 | C32 | C33 | C34 | C35 |
| C41 | C42 | C43 | C44 | C45 |
| C51 | C52 | C53 | C54 | C55 |

FIG. 2B

AFTER MOVEMENT
(C33)

| C11 | C12 | C13 | C14 | C15 |
|-----|-----|-----|-----|-----|
| C21 | C22 | C23 | C24 | C25 |
| C31 | C32 | C33 | C34 | C35 |
| C41 | C42 | C43 | C44 | C45 |
| C51 | C52 | C53 | C54 | C55 |

FIG. 5A

PRIOR TO
MOVEMENT (C22)

| C11 | C12 | C13 | C14 | C15 |
|-----|-----|-----|-----|-----|
| C21 | C22 | C23 | C24 | C25 |
| C31 | C32 | C33 | C34 | C35 |
| C41 | C42 | C43 | C44 | C45 |
| C51 | C52 | C53 | C54 | C55 |

FIG. 5B

AFTER MOVEMENT
(C33)

| C11 | C12 | C13 | C14 | C15 |
|-----|-----|-----|-----|-----|
| C21 | C22 | C23 | C24 | C25 |
| C31 | C32 | C33 | C34 | C35 |
| C41 | C42 | C43 | C44 | C45 |
| C51 | C52 | C53 | C54 | C55 |

FIG. 9

| SERVICE REQUEST TIMING | TERMINAL DEVICE | LOCATION (LATITUDE/LONGITUDE) | SPEED (Km/TIME) |
|---|---|---|---|
| T1 | 100 | 35.00/139.01 | 30 |
| T2 | 100 | 35.00/139.02 | 35 |
| T3 | 100 | 35.00/139.03 | 33 |
| T4 | 100 | 35.00/139.04 | 40 |

FIG. 11

| SPEED | 5 | 10 | 15 | 20 | 25 | 30 | 35 | 40 | 45 | 50 | 55 | 60 | 65 | 70 | 75 |
|---|---|---|---|---|---|---|---|---|---|---|---|---|---|---|---|
| DISTRIBUTION | 0 | 0.001 | 0.005 | 0.071 | 0.044 | 0.092 | 0.15 | 0.191 | 0.191 | 0.15 | 0.092 | 0.04 | 0.017 | 0.05 | 0.001 |

EDGE SERVER AND DATA MANAGEMENT METHOD

CROSS-REFERENCE TO RELATED APPLICATION

This application is a continuation application of International Application PCT/JP2017/047076 filed on Dec. 27, 2017 and designated the U.S., the entire contents of which are incorporated herein by reference. The International Application PCT/JP2017/047076 is based upon and claims the benefit of priority of the prior Japanese Patent Application No. 2017-007343, filed on Jan. 19, 2017, the entire contents of which are incorporated herein by reference.

FIELD

The embodiments discussed herein relate to an edge server and a data management method.

BACKGROUND

In cloud services, a server in the cloud (hereinafter called a cloud server) offers, as services, data saving and software execution, such as saving photographs, moving images, and other data and transmitting to a terminal device results obtained by executing software, which have been performed by terminal devices. However, as the number of users of the cloud services increases, the processing load on the cloud server increases. To address this, for example, edge servers that perform some of the computation processes of software and temporarily retain large-scale data are deployed close to terminal devices in some cases.

Each edge server has a corresponding coverage area for providing a service. A terminal device is wirelessly connected to an edge server corresponding to a coverage area where the terminal device is located, and performs communication. The edge server to which the terminal device is wirelessly connected changes as the terminal device moves.

To avoid interruption of a service received by a terminal device when an edge server to which the terminal device is wirelessly connected changes, data on the terminal device accumulated by an edge server that is in wireless connection with the terminal device is also stored in edge servers corresponding to the proximate coverage areas. Thus, even when the terminal device moves to a proximate edge server, the terminal device may continuously receive the service.

Examples of the related art include Japanese Laid-open Patent Publication No. 2000-268212, Japanese Laid-open Patent Publication No. 2015-156623, and Japanese Laid-open Patent Publication No. 2015-161545.

However, in the case of storing the same data in all the proximate edge servers, as the number of terminal devices in a communication system increases, the amounts of data stored in the edge servers increase. In an edge server, an increase in the amount of stored data increases the cost of constructing equipment, such as increasing the number of hard disks or changing to a computer with more storage capacity.

In view of the above, it is desirable to provide an edge server and a data management method that reduce the amounts of data to be stored.

SUMMARY

According to an aspect of the embodiments, an apparatus includes an edge server includes a memory configured to store obtained terminal information and a processor coupled to the memory and configured to obtain, from the terminal device, terminal information including a location and a moving speed of the terminal device and at a first time when the terminal device is located within a coverage area of the edge server, estimate a location of the terminal device at a second time after the first time based on at least first terminal information of the terminal device obtained at the first time, and copy the accumulated edge data of the terminal device to another edge server whose coverage area includes the estimated location of the terminal device at the second time.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram illustrating an example of a configuration of a wireless communication system;

FIG. 2A and FIG. 2B are diagrams illustrating examples in which a plurality of edge servers share edge data;

FIG. 5A and FIG. 5B are diagrams illustrating examples of destinations for copying edge data in an estimated destination transfer method;

FIG. 9 is a diagram illustrating an example of a terminal information table of an edge server;

FIG. 11 is a diagram illustrating an example in which, for the terminal devices that have moved at a moving speed of kilometers per hour (km/h), a distribution of moving speeds that may change by the time of obtaining the next terminal information is exhibited;

DESCRIPTION OF EMBODIMENTS

Figure 3:
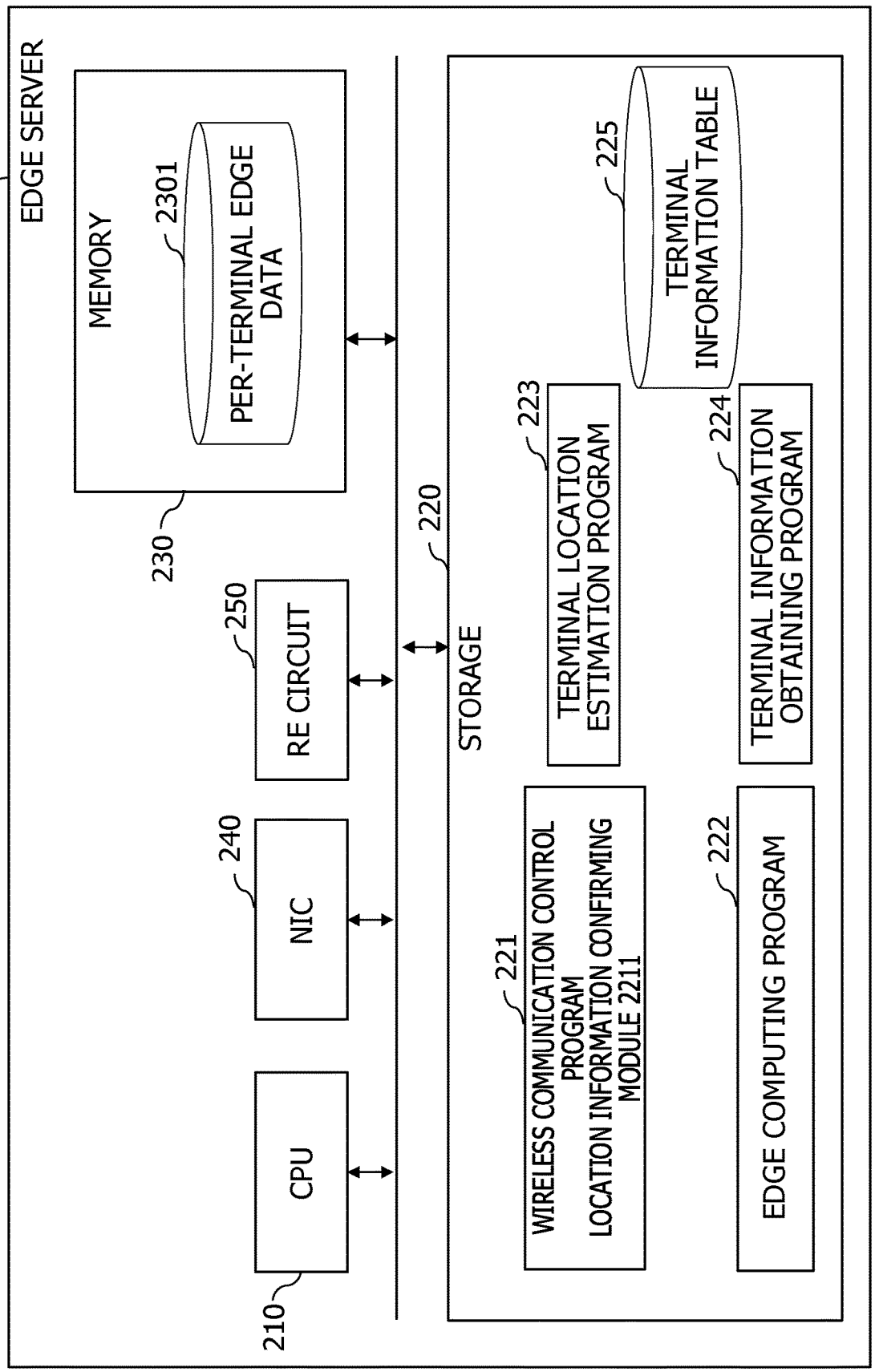
FIG. 3 is a diagram illustrating an example of a configuration of an edge server.

Hereinafter, the present embodiments will be described in detail with reference to the accompanying drawings. The problems and embodiments described herein are exemplary and are not intended to limit the scope of the present disclosure. For example, when expressions described herein are different but technically equivalent, the techniques of the present disclosure may be applied even though the expressions are different, and the different expressions are not intended to limit the scope of the present disclosure.

First Embodiment

A first embodiment will be described below.
<Example of Configuration of Wireless Communication System>
FIG. 1 is a diagram illustrating an example of a configuration of a wireless communication system 10. The wireless communication system 10 includes a terminal device 100, edge servers 200-1 and 200-2 (which hereinafter may be called edge servers 200), and a network 300.

The network 300 is, for example, a cloud server group that offers services, such as video distribution and car navigation, to the terminal device 100. The network 300 is also a network that connects with the edge servers 200-1 and 200-2 and relays communication between the edge servers 200-1 and 200-2.

The terminal device 100 is, for example, a mobile communication device, such as a smartphone or a tablet terminal, and moves in the wireless communication system 10. FIG. 1 illustrates an example in which the terminal device 100 moves, and a terminal device 100-a denotes the terminal device 100 prior to movement and a terminal device 100-b denotes the terminal device 100 after the movement. The terminal device 100, for example, communicates, via the edge server 200, with a cloud server (also called a first server) and receives a service from the cloud server.

The edge server 200 has a coverage area indicating the range in which the edge server 200 is wirelessly connected to the terminal device 100. The edge server 200-1 has a coverage area C1 and the edge server 200-2 has a coverage area C2. In the below description, an edge server 200-x (x being a numeric value) has a coverage area Cx.

The edge server 200 accumulates (stores) some or all of data that is used for communication by the terminal device 100. The edge server 200, for example, serves as an alternative to a cloud server to perform some or all of the processes. In this case, the data accumulated by the edge server 200 is application programs and objects of the processes to be performed by the edge server 200 serving as the alternative. The edge server 200 serves as an alternative to a cloud server to save and transmit some or all of data to be transmitted or saved by the cloud server. In this case, the data accumulated by the edge server 200 is the data to be saved or transmitted by the edge server 200 serving as the alternative. Edge data is, for example, all or some of the data saved by the alternative to the cloud server or the application programs of the processes performed by the alternative to the cloud server. The edge data is data accumulated for each terminal device. The edge data may include terminal information described later.

In the wireless communication system 10, the terminal device 100-a prior to movement is located within the coverage area C1 and performs communication via the edge server 200-1 having the coverage area C1. Then, the terminal device 100 moves from the terminal device 100-a to the terminal device 100-b. The terminal device 100-b after movement is located within the coverage area C2 and performs communication via the edge server 200-2 having the coverage area C2.

In some cases, the edge server 200 shares edge data with another edge server 200 in order to allow the terminal device 100 to receive a cloud service without interruption if the edge server 200 has been changed by movement of the terminal device 100. Sharing of edge data means that the edge data of some terminal device 100 is stored in a plurality of edge servers 200.

FIG. 2A and FIG. 2B are diagrams illustrating examples in which a plurality of edge servers 200 share edge data. C11 to C55 denote coverage areas. The coverage areas C11 to C55 correspond to edge servers 200-11 to 200-55, respectively. The terminal device 100 is assumed to be located in C22 prior to movement and is assumed to be located in C33 after the movement. FIG. 2A and FIG. 2B respectively illustrate the accumulations of data prior to and after movement of the terminal device 100. The shaded coverage areas are coverage areas corresponding to edge servers 200 that store edge data of the terminal device 100. The method by which the edge server 200 transfers edge data to the proximate edge servers 200 is called a proximity transfer method, and the proximity transfer method will be described below.

The terminal device 100 prior to movement is wirelessly connected to the edge server 200-22 and receives a service from a cloud server. The edge server 200-22 accumulates (stores) edge data of the terminal device 100. The edge server 200-22 transfers the accumulated data to all the adjacent edge servers 200 and causes the transferred data to be copied to all the adjacent edge servers 200. All the adjacent edge servers 200 are edge servers 200 corresponding to the coverage areas C11, C12, C13, C21, C23, C31, C32, and C33 shaded in FIG. 2A.

After the terminal device 100 has moved, the terminal device 100 is wirelessly connected to and communicates with the edge server 200-33, thereby receiving a service. In the edge server 200-33, as illustrated in FIG. 2A, edge data of the terminal device 100 has been copied and is stored before the terminal device 100 moves. If the terminal device 100 moves in any direction from the coverage area C22, the edge server 200 corresponding to the coverage area of the destination stores therein the edge data of the terminal device 100, and therefore the terminal device 100 may receive a service without interruption. Upon movement of the terminal device 100 to the coverage area C33, the edge server 200-33 transfers edge data of the terminal device 100 stored in the edge server 200-33 to all the adjacent edge servers 200 and causes the transferred edge data to be copied to all the adjacent edge servers 200. In such a manner, according to the proximity transfer method, as the terminal device 100 moves, the edge server 200 transfers edge data of the terminal device 100 to all the adjacent edge servers 200 and causes the transferred edge data to be copied to all the adjacent edge servers 200.

The edge server 200 to which the moved terminal device 100 is wirelessly connected is the edge server 200-33, and the edge servers 200 to which edge data is to be copied are eight edge servers 200, the edge servers 200-11, 200-12, 200-13, 200-21, 200-23, 200-31, 200-32, 200-33 as illustrated in FIG. 2A. For example, the edge data copied to edge servers other than the edge server 200-33 to which the terminal device 100 has moved is data that will not be used by the terminal device 100 and is unnecessary for the terminal device 100 to receive the service. In order to copy unnecessary data, the edge servers 200 require capacity for storing an enormous amount of data, which increases the cost of constructing a wireless communication system.

Accordingly, in the first embodiment, not the proximity transfer method but an estimated destination transfer method is used. In the estimated destination transfer method, the edge server 200 obtains, from the terminal device 100 wirelessly connected thereto, terminal information including the location and the moving speed of the terminal device 100. The edge server 200 then stores the obtained terminal information and, based on at least the terminal information of the terminal device 100 for estimation, estimates the location of the terminal device 100 after the movement. Further, the edge server 200 transfers the edge data of the terminal device 100 to another edge server 200 whose coverage area includes the estimated location after the movement, and causes the edge data to be copied to the other edge server 200. This decreases the number of the edge servers 200 to which edge data is copied, and therefore the data capacity of the edge servers 200 may be reduced.

<Example of Configuration of Edge Server>

FIG. 3 is a diagram illustrating an example of a configuration of the edge server 200. The edge server 200 includes a central processing unit (CPU) 210, a storage 220, a memory 230 such as dynamic random access memory (DRAM), a network interface card (NIC) 240, and a radio frequency (RF) circuit 250. The edge server 200 is, for example, a server machine or a computer. The edge server 200 may be, for example, composed of a plurality of devices such as a device that stores data and a base station device that is wirelessly connected to the terminal device 100 and relays communication of the terminal device 100.

The storage 220 is an auxiliary storage device, such as a flash memory, a hard disk drive (HDD), or a solid state drive (SSD), for storing programs and data. In the storage 220, a wireless communication control program 221, an edge computing program 222, a terminal location estimation program 223, a terminal information obtaining program 224, and a terminal information table 225 are stored.

The memory 230 is an area in which a program stored in the storage 220 is loaded. The memory 230 is also used as an area in which a program stores data. Further, the memory 230 associates edge data of the terminal device 100 with the terminal device 100 on a per-terminal device basis, and stores the edge data as per-terminal edge data 2301. The per-terminal edge data 2301 is data stored in the memory 230 serving as an alternative to a cloud server. The per-terminal edge data 2301 may be stored in the storage 220. The per-terminal edge data 2301 may include content stored in the terminal information table 225 described later.

The NIC 240 is a network interface for connecting to another edge server 200 and the network 300. The edge server 200 communicates with another communication device by receiving a packet via the NIC 240.

The RF circuit 250 is a device wirelessly connected to the terminal device 100. The RF circuit 250, for example, includes an antenna and transmits and receives radio waves to and from the terminal device 100 to which the RF circuit 250 is wirelessly connected, thereby communicating with the terminal device 100.

The CPU 210 performs a wireless communication control process by executing the wireless communication control program 221. The wireless communication control process is a process of establishing wireless connection with the terminal device 100 and relaying communication performed by the terminal device 100. The wireless communication control process also determines whether the terminal device 100 is located within the coverage area of this edge server, and if the terminal device 100 is not located within the coverage area of this edge server, instructs the terminal device 100 to establish wireless connection to an edge server having a coverage area in which the terminal device 100 is located.

The CPU 210 performs a location information confirming process by executing a location information confirming module 2211. The location information confirming process is a process of determining whether the terminal device 100 is located within the coverage area of this edge server. The edge server 200 determines, based on location information (the latitude and longitude) of the terminal device 100, whether the terminal device 100 is located within the coverage area thereof.

The CPU 210 also performs an edge computing process by executing the edge computing program 222. The edge computing process is a process in which some or all of the process performed by a cloud computer with which the terminal device 100 communicates is performed by the CPU 210 serving as an alternative to the cloud computer. The edge computing process is also a process in which some or all of data transmitted to and received from a cloud computer with which the terminal device 100 communicates is saved and transmitted to and received from the terminal device 100 by the CPU 210 serving as an alternative to the cloud computer.

The CPU 210 also constructs a data management unit and performs a terminal location estimating process by executing the terminal location estimation program 223. The terminal location estimating process is a process of estimating the location where the terminal device 100 will be located after a predetermined time period, and copying edge data of the terminal device 100 to the edge server 200 whose coverage area includes the estimated location.

The CPU 210 also constructs an obtaining unit and a storage unit and performs a terminal information obtaining process by executing the terminal information obtaining program 224. The terminal information obtaining process is a process of receiving terminal information from the terminal device 100. The terminal information, for example, includes the location and the moving speed of the terminal device 100. The terminal information may be included in a service request transmitted by the terminal device 100. The edge server 200 stores in the terminal information table 225 the terminal information received in the terminal information obtaining process.

<Example of Configuration of Terminal Device>

Figure 4:
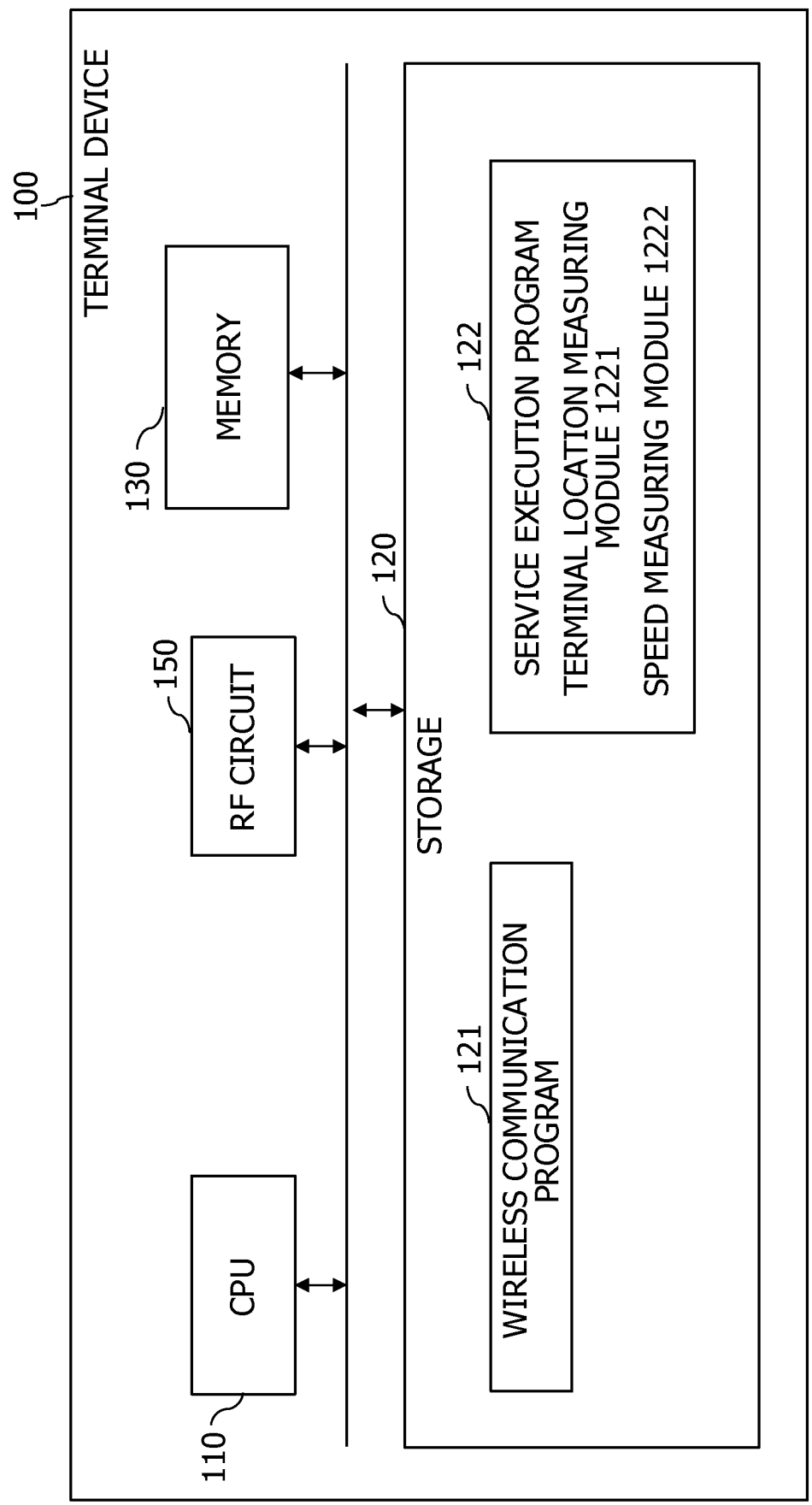
FIG. 4 is a diagram illustrating an example of a configuration of a terminal device.

FIG. 4 is a diagram illustrating an example of a configuration of the terminal device 100. The terminal device 100 includes a CPU 110, a storage 120, a memory 130 such as a DRAM, and an RF circuit 150.

The storage 120 is an auxiliary storage device, such as a flash memory, an HDD, or a SSD, for storing programs and data. In the storage 120, a wireless communication program 121 and a service execution program 122 are stored.

The memory 130 is an area in which a program stored in the storage 120 is loaded. The memory 130 is also used as an area in which a program stores data.

The RF circuit 150 is a device wirelessly connected to the edge server 200. The RF circuit 150, for example, includes an antenna and transmits and receives radio waves to and from the edge server 200 to which the RF circuit 150 is wirelessly connected, thereby communicating with another communication device via the edge server 200.

The CPU 110 performs a wireless communication process by executing the wireless communication program 121. The wireless communication process is a process of communicating with a communication device serving as a communication partner via the edge server 200. In the wireless communication process, the terminal device 100, for example, communicates, via the edge server 200, with a cloud server and receives a service from the cloud server.

The CPU 110 performs a service execution process by executing the service execution program 122. The service execution process is a process in which the terminal device 100 receives a service from a cloud server. In the service execution process, the terminal device 100, for example, transmits terminal information to the edge server 200. The terminal device 100, for example, transmits terminal information at regular intervals. Alternatively, the terminal device 100, for example, transmits terminal information at irregular intervals in accordance with the movement distance, radio-wave conditions, and the like. The terminal device 100 may, for example, transmit terminal information in response to a request from the edge server 200.

The CPU 110 performs a terminal location measuring process by executing a terminal location measuring module 1221. The terminal location measuring process is a process of measuring the location (for example, the latitude, the longitude, and so on) of the terminal device 100. The terminal device 100, for example, incorporates information on the measured location of the terminal device 100 in terminal information and transmits the terminal information to the edge server 200.

The CPU 110 performs a speed measuring process by executing a speed measuring module 1222. The speed measuring process is a process of measuring the moving speed of the terminal device 100. The terminal device 100 incorporates information on the measured moving speed of the terminal device 100 in terminal information and transmits the terminal information to the edge server 200.

<Process of Copying Edge Data in Estimated Destination Transfer Method>

FIG. 5A and FIG. 5B are diagrams illustrating examples of destinations for copying edge data in the estimated destination transfer method in the wireless communication system 10. As illustrated in FIG. 5A, the terminal device 100 prior to movement is located in the coverage area C22. The edge server 200-22 estimates that the terminal device 100 will move to the coverage area C33, transfers edge data of the terminal device 100 to the edge server 200-33, and causes the transferred edge data to be copied to the edge server 200-33. Then, as illustrated in FIG. 5B, the terminal device 100 moves to the coverage area C33. The edge server 200-33 uses the copied edge data of the terminal device 100 to provide a service to the terminal device 100. The edge server 200-33 estimates that the terminal device 100 will move to the coverage area C44 and transfers edge data of the terminal device 100 to the edge server 200-44.

As described above, in the first embodiment, since the edge server 200 transfers edge data only to the edge server 200 estimated as the destination and does not copy edge data to the edge servers 200 to which the terminal device 100 is unlikely to be moved, and therefore the amounts of data stored in the edge servers 200 are reduced. The process of copying edge data will be described in detail below.

Figure 6:
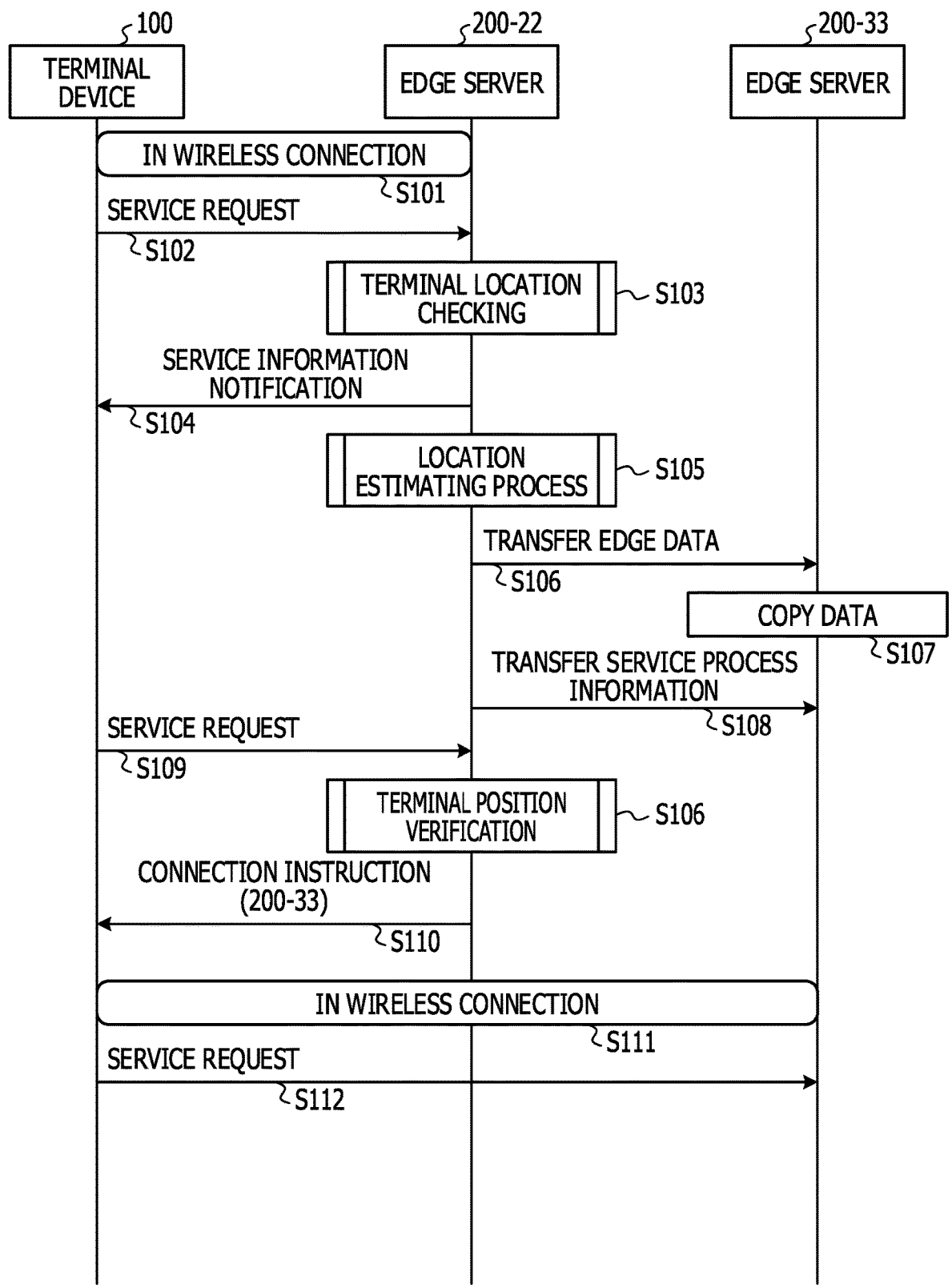
FIG. 6 is a diagram illustrating an example of a sequence in an estimated destination transfer method.

FIG. 6 is a diagram illustrating an example of a sequence in the estimated destination transfer method. The terminal device 100 is in wireless connection with the edge server 200-22 (S101). The terminal device 100, for example, accesses a cloud server and receives a service from the cloud server. To receive a service, the terminal device 100 transmits, via the edge server 200-22, a service request w to the cloud server (S102).

The service request, for example, includes the terminal information of the terminal device 100. The terminal information includes, for example, the location information, the moving speed, and radio-wave conditions of the terminal device 100. In the case where the terminal device 100 is a vehicle or a communication device associated with a vehicle, the terminal information may include, for example, the conditions of vehicle-mounted devices (the conditions of a meter, a window, and an air conditioner, the inflation pressure, the amount of exhaust gas, and the conditions of an engine). The service request may include, for example, the service progress status indicating to what extent the service has been received, and requests for changes, additions, suspensions, and so on of the service content.

Upon receiving the terminal information included in the service request (S102), the edge server 200-22 performs a terminal location checking process (S103).

Figure 7:
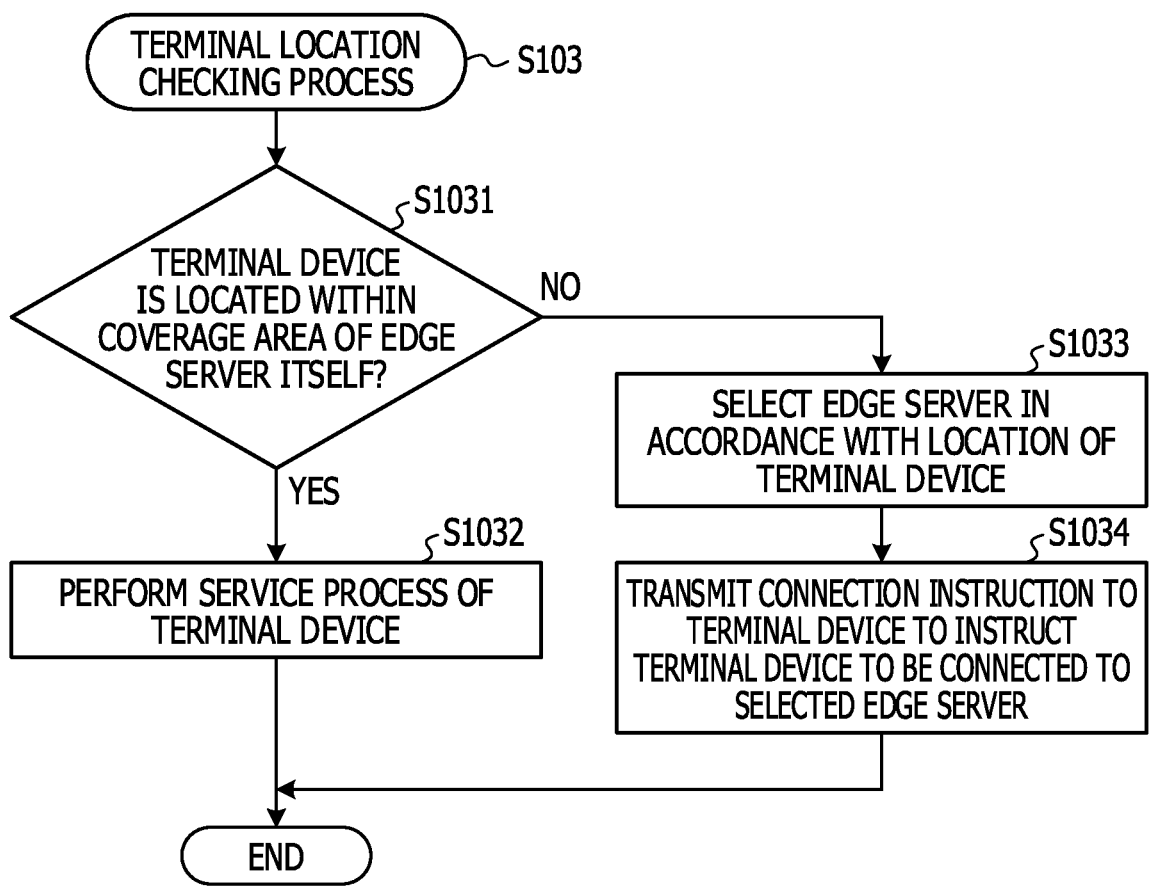
FIG. 7 is a diagram illustrating an example of a process flowchart of a terminal location checking process in an edge server.

FIG. 7 is a diagram illustrating an example of a process flowchart of the terminal location checking process in the edge server 200. The edge server 200 determines whether the terminal device 100 that has transmitted terminal information is located within the coverage area thereof (S1031). The coverage area of the edge server 200 is, for example, a range surrounded by a quadrangle consisting of four points on the coordinate plane, each of the points being joined by a straight line. The coverage area of the edge server 200 is, for example, a range surrounded by a circle around one point on the coordinate plane. The edge server 200 determines, based on the location of the terminal device 100 included in the terminal information, whether the terminal device 100 is located within the coverage area thereof.

If the edge server 200 determines that the terminal device 100 is located within the coverage area thereof (Yes in S1031), the edge server 200 performs a service process of the terminal device 100 (S1032). The service process of the terminal device 100 is a process in accordance with the content of a service request, for example, a process of transmitting the service request to a cloud server or a process in which the edge server 200 uses edge data of the terminal device 100 to execute part of the service to be provided to the terminal device 100. In the service process, the edge server 200, for example, transmits to the terminal device 100 a service information notification received from the cloud server or generated in the edge server 200. The service information notification, for example, includes data and information associated with a service to be received by the terminal device 100.

If the edge server 200 determines that the terminal device 100 is not located within the coverage area (No in S1031), the edge server 200 selects the edge server 200 in accordance with the location of the terminal device 100 (S1033). The edge server 200, for example, makes an inquiry to a management server that stores correspondence relationships between the edge servers 200 and the coverage areas. The edge server 200 then receives the identifier and address of the edge server 200 in accordance with the location of the terminal device 100 from the management server. The edge server 200, for example, stores, in an internal memory thereof, the correspondence relationships between the edge servers 200 and the coverage areas and extracts, from the stored correspondence relationships, the edge server 200 in accordance with the location of the terminal device 100.

The edge server 200 transmits a connection instruction to the terminal device 100 to instruct the terminal device 100 to be connected to the selected edge server 200 (S1034). The connection instruction, for example, includes the identifier of the selected edge server 200.

Referring now to the sequence in FIG. 6, in the terminal location checking process in S103, the edge server 200-22 determines whether the terminal device 100 is located within the coverage area (S1031 in FIG. 7). The edge server 200-22 determines that, as illustrated in FIG. 5A, the terminal device 100 prior to movement is located in the coverage area C22 (Yes in S1031 of FIG. 7). The edge server 200-22 then performs the service process of the terminal device 100 (S1032 of FIG. 7) and transmits a service information notification to the terminal device 100 (S104).

Upon receiving the service information notification, the terminal device 100 performs a process in accordance with a service to be received. For example, in the case where the service to be received is a video distribution service, the terminal device 100 reproduces video data included in the received service information notification on a display unit of the terminal device 100. For example, in the case where the service to be received is navigation, the terminal device 100 displays traffic congestion information included in the received service information notification on the display unit of the terminal device 100.

After performing the terminal location checking process, the edge server 200-22 performs a location estimating process (S105). In the sequence in FIG. 6, the location estimating process is performed after the terminal location checking process has been performed; however, the location estimating process may be performed before the terminal location checking process is performed.

Figure 8:
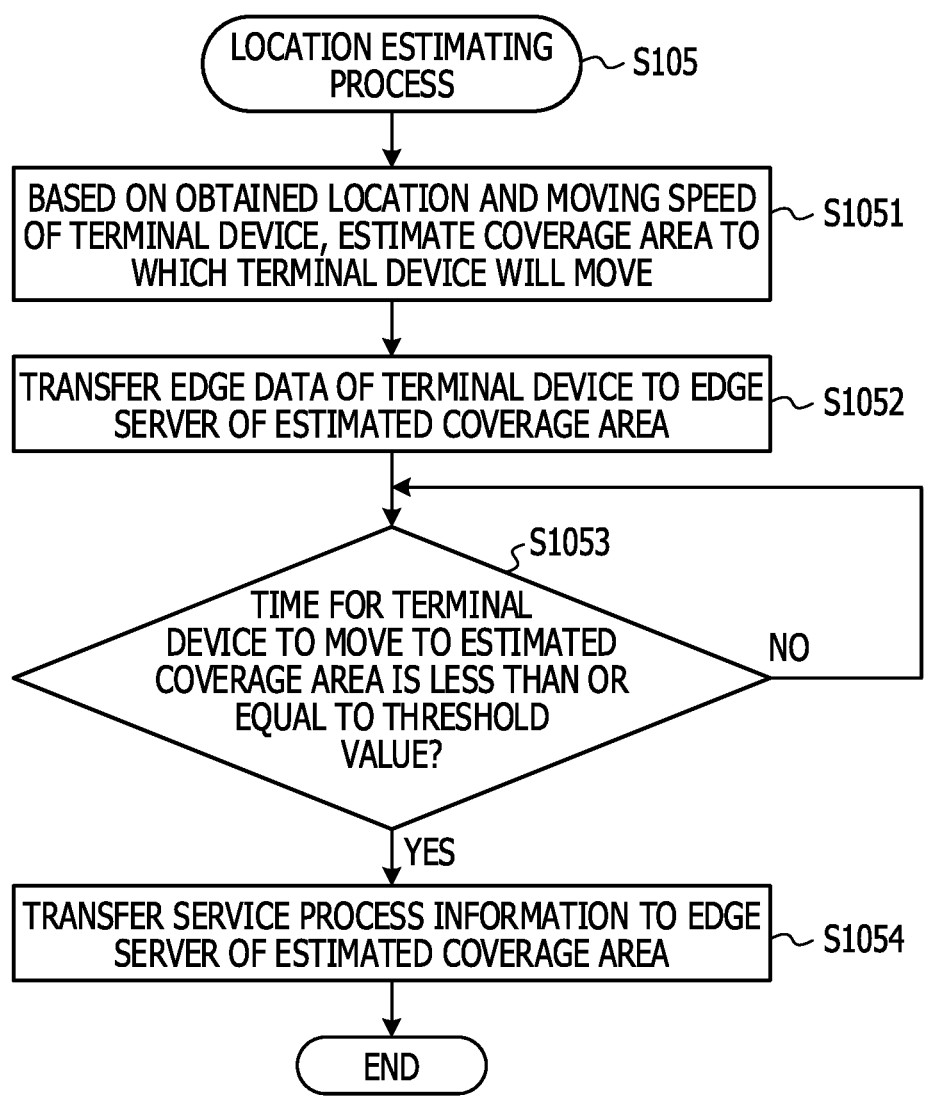
FIG. 8 is a diagram illustrating an example of a process flowchart of a location estimating process in an edge server.

FIG. 8 is a diagram illustrating an example of a process flowchart of the location estimating process in the edge server 200. Based on the location and the moving speed of the terminal device 100 included in the terminal information, the edge server 200 estimates the location where the terminal device 100 will be located after a predetermined time period (S1051).

In estimating the location where the terminal device 100 will be located after a predetermined time period, the edge server 200 estimates, for example, a moving direction and a moving speed of the terminal device 100. Based on the estimated moving direction and the estimated moving speed, the edge server 200 then estimates the location where the terminal device 100 will be located after a predetermined time period.

In the first embodiment, the edge server 200 estimates, as an estimated moving direction, the direction from a location (a first location) included in terminal information obtained last (for example, first terminal information obtained at a first time) to a location (a second location) included in terminal information (for example, second terminal information obtained at a second time prior to the first time) obtained previously (for example, obtained one time before the last obtaining).

In the first embodiment, the edge server 200 estimates, as an estimated moving speed, the moving speed included in terminal information obtained last. A method for estimating an estimated moving direction and a method for estimating a location where the terminal device 100 will be located after a predetermined time period, in the first embodiment, will be described below.

FIG. 9 is a diagram illustrating an example of the terminal information table 225 of the edge server 200. In the terminal information table 225, for example, "service request timing", "terminal device", "location (latitude/longitude)", and "moving speed (km/h)" are stored. "Service request timing" denotes a time at which a service request (or terminal information) is received, and, in FIG. 9, T1 represents the earliest time point and as x of Tx (x being an integer) has a greater value, Tx represents a later time point. "Terminal device" denotes the identifier of the terminal device 100. "Location (latitude/longitude)" denotes the location of the terminal device 100 and is the latitude and longitude of the terminal device 100. "Moving speed (km/h)" denotes the moving speed of the terminal device 100, in units of kilometers per hour.

From FIG. 9, the edge server 200 estimates a moving speed of 40 km/h at a timing T4 as an estimated moving speed of the terminal device 100. The edge server 200 then estimates, from FIG. 9, an estimated moving direction based on the location (35.01/139.04) at the timing T4 from the location (35.00/139.03) at a timing T3. For example, the edge server 200 estimates the direction from the previous location of the terminal device 100 to the current location of the terminal device 100 as the moving direction of the terminal device 100 after the current time point.

Figure 10:
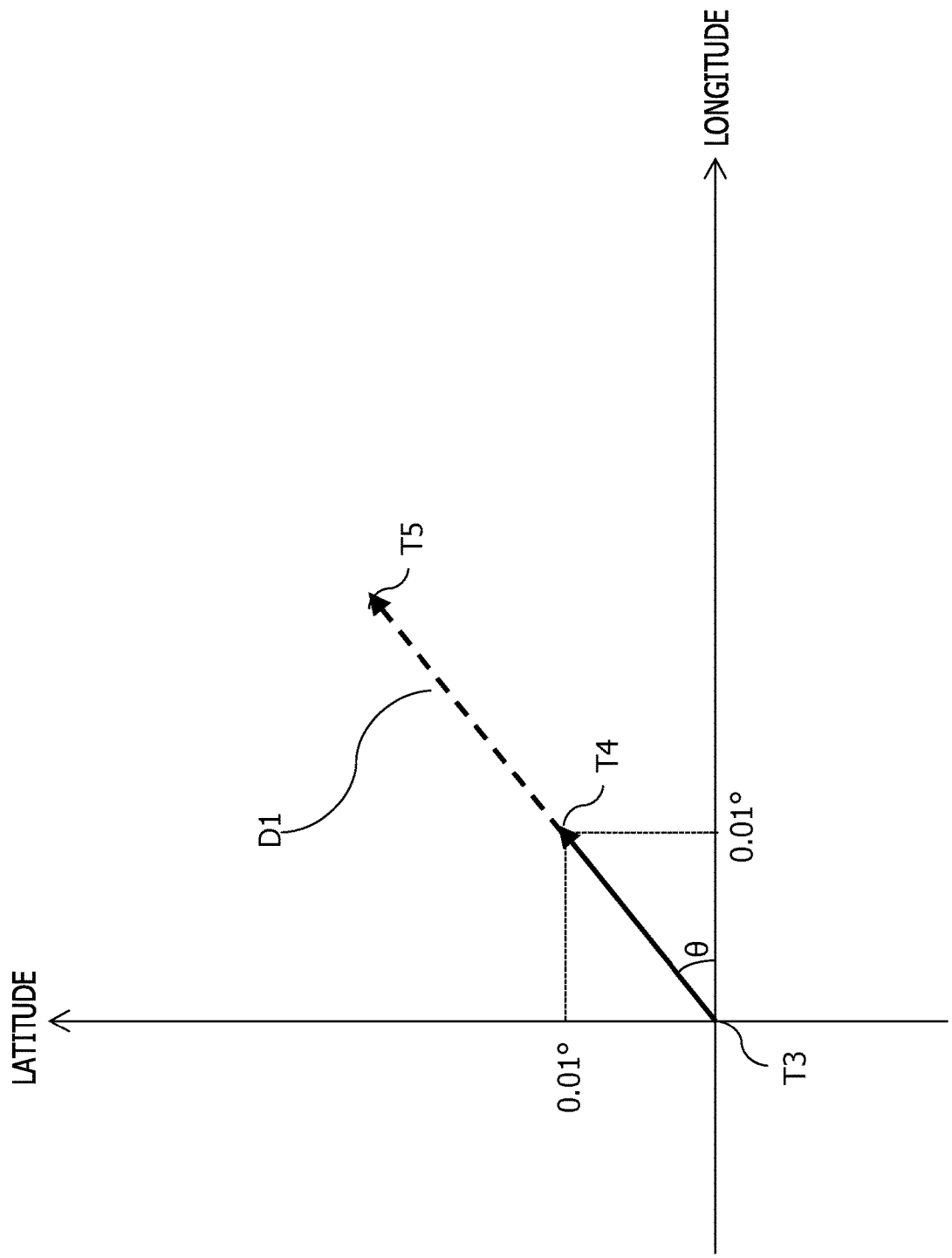
FIG. 10 is a diagram illustrating an example of a location of a terminal device at a timing.

FIG. 10 is a diagram illustrating an example of a location of the terminal device 100 at a timing T5. For example, the edge server 200 assumes that a moving direction θ from the timing T3 to the timing T4 is an estimated moving direction. For example, the terminal device 100 is estimated to move in the direction of an arrow D1. The location of each timing in FIG. 10 is illustrated relative to the location at the timing T3. As illustrated in FIG. 10, assuming that the latitude and longitude of the location at the timing T3 are both 0°, the location at the timing T4 has a longitude of 0.01° and a latitude of 0.01°. From a distance obtained by multiplying the estimated moving speed by a predetermined time period and the estimated moving direction, the edge server 200 estimates that the location at the timing T5 will be in the neighborhood of the head of the arrow D1. At this point, as the estimated moving direction, the direction of, for example, ±180 degrees around the moving direction θ may be regarded as a direction in which the terminal device 100 may move.

Referring now to the process flowchart in FIG. 8, the edge server 200 transfers the edge data of the terminal device 100 to the edge server 200 whose coverage area includes the estimated location (S1052). The edge server 200 to which edge data has been transferred copies the edge data to the internal memory.

The edge server 200 waits for the state where the time for the terminal device 100 to move to a coverage area including the estimated location is less than or equal to a threshold value (No in S1053). If the time for the terminal device 100 to move to the coverage area including the estimated location is less than or equal to the threshold value (Yes in S1053), the edge server 200 transmits service process information to the edge server 200 to which edge data has been copied (S1054). The service process information, for example, represents to what extent the service has been received by the terminal device 100. For example, in the case where the service to be received is a video distribution service, the service process information is information on to what extent video data has been transmitted to the terminal device 100. For example, in the case where the service to be received is navigation, the service process information is information such as the destination and the moving state of the terminal device 100.

Referring now to the sequence in FIG. 6, the edge server 200 estimates that, as illustrated in FIG. 5A and FIG. 5B, the location where the terminal device 100 will be located after the predetermined time period is the coverage area C33 (S1051 in FIG. 8), and transfers edge data to the edge server 200-33 (S106, S1052 in FIG. 8).

Upon receiving the edge data, the edge server 200-33 copies the edge data to the internal memory (S107).

If the edge server 200-22 detects that the terminal device 100 moves and the time for the terminal device 100 to move to the coverage area C33 is less than or equal to the threshold value (Yes in S1053 of FIG. 8), the edge server 200-33 transmits service process information to the edge server 200-33 (S108, S1054 in FIG. 8).

Then, the terminal device 100 moves farther, and the terminal device 100 transmits a service request to the edge server 200-22 (S109). Upon receiving the service request, the edge server 200-22 performs the terminal location checking process (S103). The edge server 200-22 detects that the terminal device 100 has moved and is not located within the coverage area C22 (No in S1031 of FIG. 7). Then, since the terminal device 100 is located in the coverage area C33, the edge server 200-22 selects the edge server 200-33 as the edge server 200 in accordance with the location of the terminal device 100 (S1033). The edge server 200-22 transmits a connection instruction to the terminal device 100 to instruct the terminal device 100 to be connected to the selected edge server 200-33 (S110, S1034 in FIG. 7).

Upon receiving the connection instruction, the terminal device 100 establishes wireless connection to the edge server 200-33 included in the connection instruction (S111). The terminal device 100 then transmits a service request to the edge server 200-33 to which the terminal device 100 is wirelessly connected (S112).

In the first embodiment, based on terminal information, the edge server 200 estimates the location where the terminal device 100 will be located after a predetermined time period. The edge server 200 then causes the edge server 200 at the estimated location to copy edge data thereto. Thus, the edge server 200 does not cause data to be copied to the edge server 200 of the coverage area to which the terminal device 100 will not move, and therefore the capacity of the edge server 200 for storing data may be reduced as compared with the proximity transfer method.

Second Embodiment

In a second embodiment, based on terminal information of all the terminal devices 100 in the wireless communication system 10 (third terminal information), the edge server 200 estimates an estimated moving speed.

<Process of Estimating Estimated Moving Speed>

The edge server 200 generates a distribution of shifts in moving speed, based on moving speeds included in terminal information of the terminal devices 100. The shifts in moving speed are, for example, changes from moving speeds (third moving speeds) of terminal information obtained at a certain timing (third terminal information) to moving speeds (fourth moving speeds) of terminal information obtained at a timing subsequent to the certain timing (fourth terminal information).

FIG. 11 is a diagram illustrating an example in which, for the terminal devices 100 that have moved at a moving speed of 40 km/h, a distribution of moving speeds that may change by the time of obtaining the next terminal information is exhibited. In FIG. 11, "speed" means a moving speed at the time when the next terminal information is obtained, and "distribution" denotes the probability (frequency) that the moving speed of a terminal device will shift to a moving speed denoted by "speed". FIG. 11 illustrates that, for example, the possibility that the terminal device 100 that moves at 40 km/h at a first timing will move at 10 km/h at a second timing is 0.001, that is, assuming that the total number of terminal devices 100 whose terminal information is under distribution is 1000, one terminal device 100 moves at 10 km/h.

Figure 12:
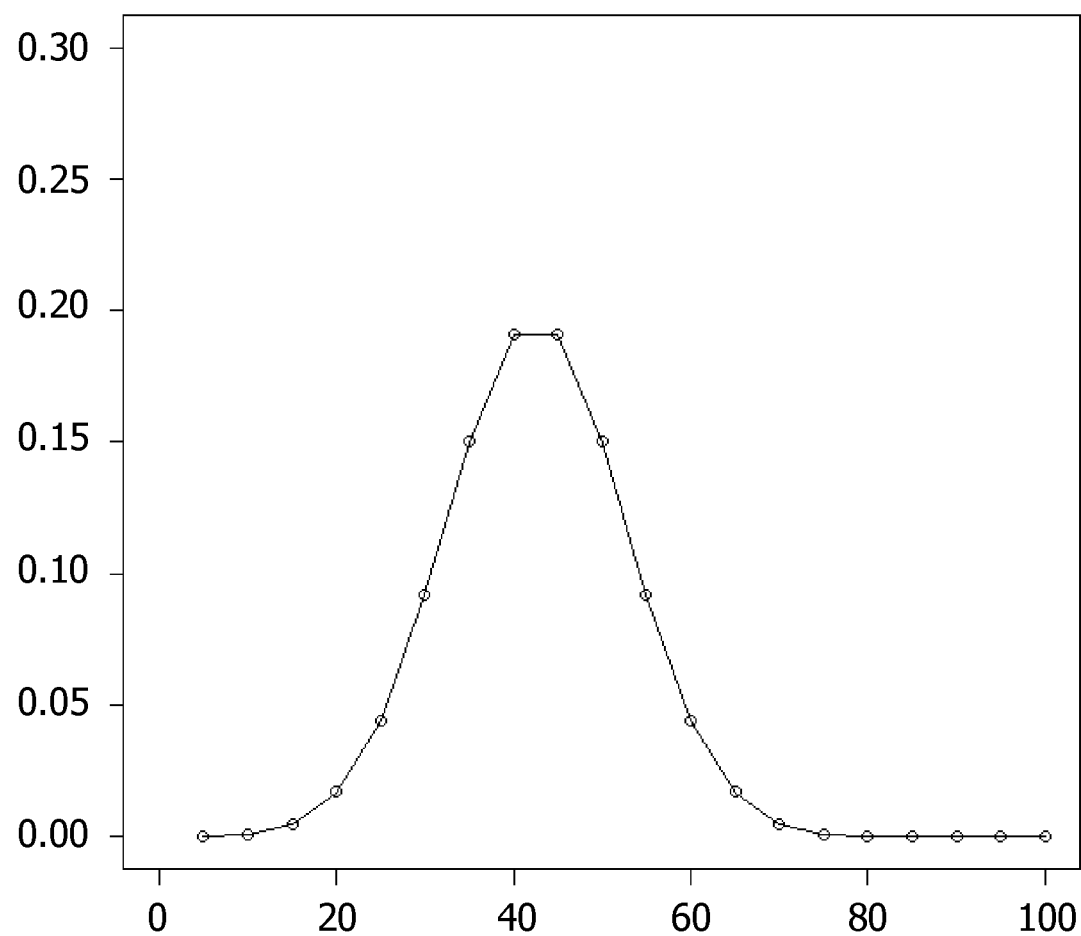
FIG. 12 is a diagram illustrating an example of a graph of a distribution in FIG. 11.

FIG. 12 is a diagram illustrating an example of a graph of a distribution in FIG. 11. In the graph in FIG. 12, the horizontal axis represents the moving speed after shifting (hereinafter referred to as the post-shift moving speed) and the vertical axis represents the distribution. As illustrated in FIG. 12, the graph of the distribution of moving speeds illustrates a distribution close to a so-called normal distribution. The occurrence probability f of a post-shift moving speed v is expressed, for example, by the following approximate expression (1).

$$f(v,a,b,c)=ae^{(-((v-b)-c)^2)} \tag{1}$$

Based on the data in FIG. 11, for example, calculating a, b, and c of expression (1) by using nonlinear least squares yields a=0.197, b=42.5, and c=14.3243. By using the calculated a, b, and c, the probability that the terminal device 100 at 40 km/h will have the moving speed v by the next timing for obtaining terminal information, that is, the occurrence frequency that the moving speed of the terminal device 100 will be v may be calculated. Thus, the probability that the terminal device 100 will reach a moving distance after a predetermined time period may be derived by multiplying the occurrence probability of a moving speed by the predetermined time period.

Although FIG. 11 illustrates shifts from 40 km/h, for example, the shifts are added up for every 10 km/h and the coefficients of a, b, and c are calculated similarly. Thus, based on the current moving speed of the terminal device 100, the edge server 200 may estimate the occurrence probability of the moving distance by the next timing for obtaining terminal information.

<Process of Copying Edge Data in Estimated Destination Transfer Method>

Figure 13:
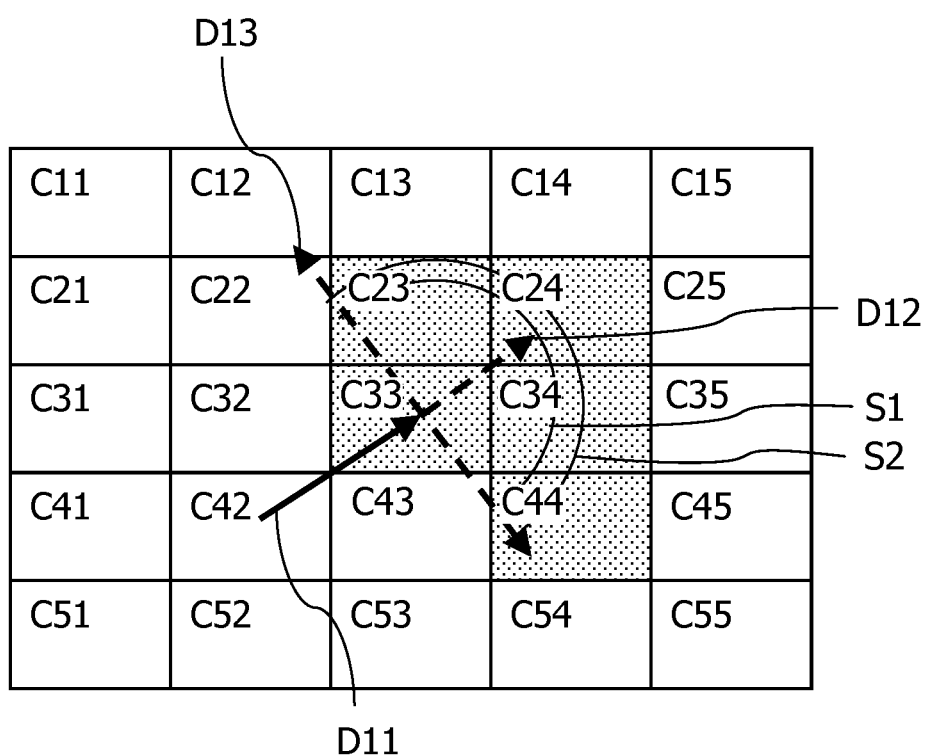
FIG. 13 is a diagram illustrating an example in which a terminal device that has moved from a coverage area to another coverage area estimates a destination.

FIG. 13 is a diagram illustrating an example in which a terminal device 100 that has moved from the coverage area C42 to the coverage area C33 estimates a destination.

The edge server 200-33 estimates a moving direction D11 from the coverage area C42 to the coverage area C33 as an estimated moving direction D12. At this point, the edge server 200-33 regards a direction D13 of, for example, ±180 degrees around the estimated moving direction D12 as a direction in which the terminal device 100 may move. For example, the edge server 200-33 regards the terminal device 100 as being able to move in the direction of a semicircle S1 around the current location of the terminal device 100.

Further, by using expression (1), the edge server 200-33 calculates, as an estimated moving speed, for example, a moving speed whose occurrence probability (occurrence frequency) after movement is greater than or equal to a predetermined probability (predetermined frequency). Assuming that the predetermined possibility (the predetermined frequency) is, for example, 0%, all the moving speeds that may occur are calculated as estimated moving speeds. Assuming that the predetermined probability (the predetermined frequency) is, for example, 10%, moving speeds whose occurrence probabilities are below some occurrence probability are not calculated as estimated moving speeds, and thus the number of edge servers 200 to which edge data is to be copied may be decreased.

Then, based on the probability of the moving distance derived by multiplying the occurrence probability of the calculated, estimated moving speed by the predetermined time period, and the direction in which the terminal device 100 may move (the direction D13), the edge server 200-33 estimates that the terminal device 100 after the predetermined time period will be located within a range surrounded by the semicircle S1 and a semicircle S2.

The edge server 200-33 transfers edge data of the terminal device 100 to the edge servers 200-23, 200-24, 200-34, and 200-44 corresponding to a coverage area including the range surrounded by the semicircle S1 and the semicircle S2. Upon receiving data, the edge servers 200-23, 200-24, 200-34, and 200-44 copy the data to the internal memories thereof.

The moving speed of the terminal device 100 is affected, for example, by road congestion conditions, the presence or absence of a signal, and so on. For example, in the case where the terminal device 100 mounted on a vehicle moves, the moving speed of some terminal device 100 and the moving speeds of the surrounding terminal devices 100 have the same or approximately the same value. For example, there are few cases where when a certain vehicle stops due to a traffic light or the speed of the certain vehicle is restricted due to traffic congestion, the certain vehicle is distinctly slow or fast as compared with the surrounding vehicles. Therefore, in the second embodiment, assuming that the shift in the moving speed of some terminal device 100 is equivalent to the shift in the moving speed of the surrounding terminal device 100, the moving speed of the terminal device 100 after movement thereof is estimated based on shifts in the moving speeds of other terminal devices 100 and the probability of the moving distance after a predetermined time period is derived. This increases the accuracy of estimation of the moving speed of the terminal device 100 and increases the probability that the terminal device 100 will move to an estimated location. The increase in the probability of the terminal device 100 moving to an estimated location decreases the probability that edge data will be copied to the edge server 200 corresponding to the coverage area to which the terminal device 100 will not move, and therefore the data capacity of the edge server 200 may be reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An edge server that is wirelessly connected to a terminal device located in a coverage area, relays communication between the terminal device and a server, and accumulates edge data, the edge data being data per the terminal device of part or all of data that the server has, the edge server comprising:
   a memory configured to store obtained terminal information; and
   a processor coupled to the memory and configured to:
   obtain, from the terminal device, terminal information including a location and a moving speed of the terminal device, and
   at a first time when the terminal device is located within a coverage area of the edge server, estimate a location of the terminal device at a second time after the first time based on at least first terminal information of the terminal device obtained at the first time, and copy the accumulated edge data of the terminal device to another edge server whose coverage area includes the estimated location of the terminal device at the second time, wherein
   the processor is configured to estimate an estimated moving direction and an estimated moving speed of the terminal device after obtaining the first terminal information, and estimate a location of the terminal device at the second time based on the estimated moving direction and the estimated moving speed,
   the processor is configured to, based on a change amount from a third moving speed included in third terminal information to a fourth moving speed included in fourth terminal information obtained prior to the third terminal information, and a moving speed included in the first terminal information, estimate the estimated moving speed of the terminal device, and
   the processor is configured to, based on a distribution of the change amount from the third moving speed to the fourth moving speed, calculate an occurrence frequency of a moving speed after a change from the moving speed included in the first terminal information, and estimate, as the estimated moving speed of the terminal device, a moving speed after the change for which the calculated occurrence frequency is greater than or equal to a predetermined frequency.

2. The edge server according to claim 1, wherein the processor is configured to estimate the estimated moving direction based on a first location included in the first terminal information and a second location included in second terminal information of the terminal device obtained prior to the first time.

3. The edge server according to claim 1, wherein the processor is configured to, in estimating the estimated moving speed of the terminal device, regard a moving speed included in the first terminal information as the estimated moving speed.

4. The edge server according to claim 1, wherein the edge data includes the terminal information to be stored.

5. The edge server according to claim 1, wherein the processor is configured to transfer the accumulated data only to another edge server whose coverage area includes the estimated location after movement.

6. The edge server according to claim 1, wherein the first time is a time at which the first terminal information has been obtained last.

7. A data management method in an edge server that is wirelessly connected to a terminal device located in a coverage area, relays communication between the terminal device and a server, and accumulates edge data, the edge data being data per the terminal device of part or all of data that the server has, the data management method comprising:
   obtaining, from the terminal device, terminal information including a location and a moving speed of the terminal device;
   storing the obtained terminal information;
   at a first time when the terminal device is located within a coverage area of the edge server, estimating a location of the terminal device at a second time after the first time based on at least first terminal information of the terminal device obtained at the first time, and copying the accumulated edge data of the terminal device to another edge server whose coverage area includes the estimated location of the terminal device at the second time;
   estimating an estimated moving direction and an estimated moving speed of the terminal device after obtaining the first terminal information, and estimate a location of the terminal device at the second time based on the estimated moving direction and the estimated moving speed;
   based on a change amount from a third moving speed included in third terminal information to a fourth moving speed included in fourth terminal information obtained prior to the third terminal information, and a moving speed included in the first terminal information, estimating the estimated moving speed of the terminal device; and based on a distribution of the change amount from the third moving speed to the fourth moving speed, calculating an occurrence frequency of a moving speed after a change from the moving speed included in the first terminal information, and estimating, as the estimated moving speed of the terminal device, a moving speed after the change for which the calculated occurrence frequency is greater than or equal to a predetermined frequency.

8. A non-transitory computer-readable storage medium storing a program that causes a processor included in a computer mounted on an edge server to execute a process, the process comprising:

obtaining, from a terminal device connected to the edge server, terminal information including a location and a moving speed of the terminal device;

storing the obtained terminal information;

at a first time when the terminal device is located within a coverage area of the edge server, estimating a location of the terminal device at a second time after the first time based on at least first terminal information of the terminal device obtained at the first time, and copying an accumulated edge data of the terminal device to another edge server whose coverage area includes the estimated location of the terminal device at the second time;

estimating an estimated moving direction and an estimated moving speed of the terminal device after obtaining the first terminal information, and estimate a location of the terminal device at the second time based on the estimated moving direction and the estimated moving speed;

based on a change amount from a third moving speed included in third terminal information to a fourth moving speed included in fourth terminal information obtained prior to the third terminal information, and a moving speed included in the first terminal information, estimating the estimated moving speed of the terminal device; and based on a distribution of the change amount from the third moving speed to the fourth moving speed, calculating an occurrence frequency of a moving speed after a change from the moving speed included in the first terminal information, and estimating, as the estimated moving speed of the terminal device, a moving speed after the change for which the calculated occurrence frequency is greater than or equal to a predetermined frequency.

* * * * *